United States Patent [19]

Maciejko et al.

[11] Patent Number: 4,650,278
[45] Date of Patent: Mar. 17, 1987

[54] FIBER OPTIC ACCESS NODES

[75] Inventors: Roman Maciejko; Yves Tremblay, both of Nepean, Canada

[73] Assignee: Northern Telecom Limited, Montreal, Canada

[21] Appl. No.: 547,244

[22] Filed: Oct. 31, 1983

[51] Int. Cl.⁴ .................................................. G02B 6/36
[52] U.S. Cl. ................................ 350/96.20; 350/96.21
[58] Field of Search ........................... 350/96.20, 96.21

[56] References Cited

U.S. PATENT DOCUMENTS

| 4,385,801 | 5/1983 | Bubanko | 350/96.21 |
| 4,387,956 | 6/1983 | Cline | 350/96.20 |
| 4,406,513 | 9/1983 | Raphael | 350/96.20 X |
| 4,422,715 | 12/1983 | Williams et al. | 350/96.20 |
| 4,427,879 | 1/1984 | Becher et al. | 350/96.20 X |

FOREIGN PATENT DOCUMENTS

| 2331801 | 11/1975 | France | 350/96.20 |
| 2479993 | 4/1980 | France | 350/96.20 |
| 54-13349 | 1/1979 | Japan | 350/96.20 |
| 0054308 | 3/1983 | Japan | 350/96.20 |

Primary Examiner—William L. Sikes
Assistant Examiner—Akm E. Ullah
Attorney, Agent, or Firm—Stuart L. Wilkinson

[57] ABSTRACT

A fiber optic access node has input and output fibers terminating at a housing. A module is retractably insertable into the housing to automatically lock into a position in which an output zone of the module aligns with the output fiber and input zone of the module aligns with the input fiber. The input and output zones may be those of fiber optic passive elements such as a bypass fiber, a fiber tap, a fiber extension loop or a wavelength division multiplexed device, or may be those of an active element such as a repeater incorporating a light emitter, a light detector and a control circuit. The fiber optic element may be encapsulated within a plastics block or can be clamped between two plates. The combination of module and housing allows rapid and easy substitution of fiber optic functions within a fiber network.

27 Claims, 7 Drawing Figures

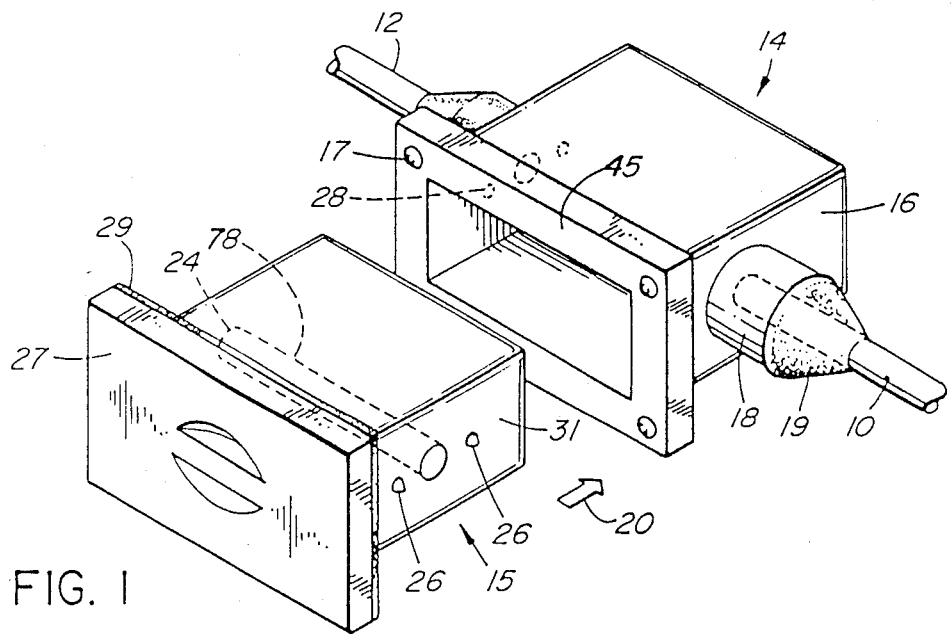
FIG. 1
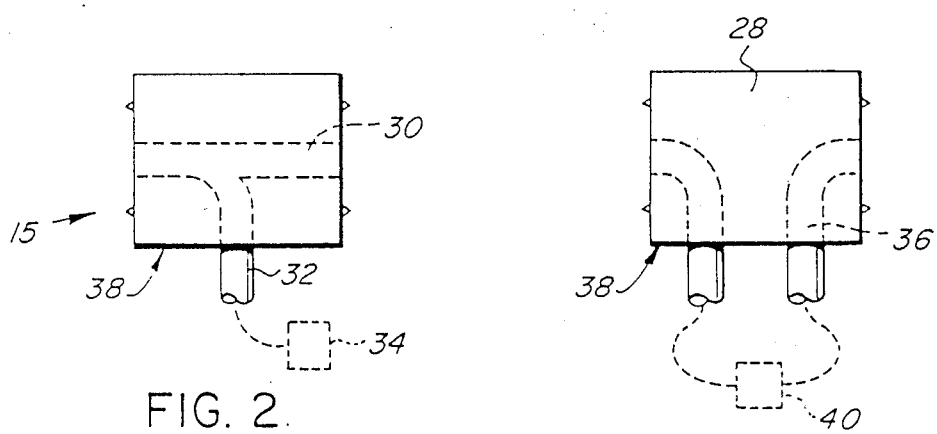
FIG. 2
FIG. 3
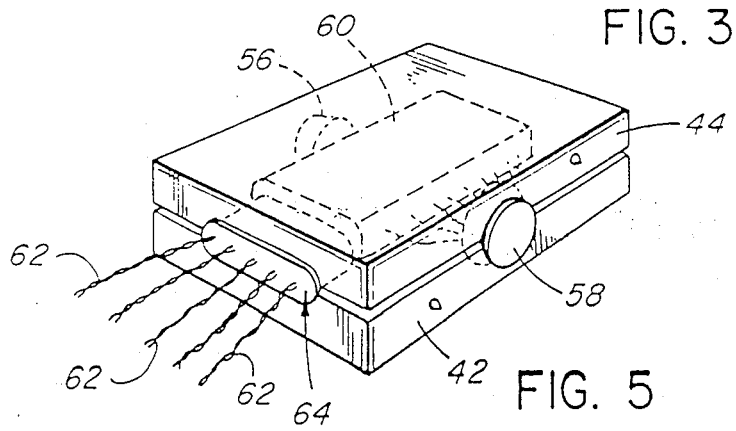
FIG. 5

FIBER OPTIC ACCESS NODES

FIELD OF THE INVENTION

This invention relates to access nodes in fiber optic links and networks. It finds particular application in local area networks.

BACKGROUND OF THE INVENTION

In one example of local area network, a fiber extends around a loop or ring. Light is transmitted from a central office around the loop from a modulated light emitting source. Depending on the activity around the loop, light is received back from the loop at a photodetector in the central office.

That activity may take the form of a variety of passive or active fiber optic devices which are inserted into the line at a number of discrete positions depending on the particular functional requirement at each position.

The functional requirements are for example a fiber optic tap at which optical signals can be both diverted from and inserted into the fiber optic channel, or a subsidiary loop providing an extension to the network, or a wavelength division multiplexer or demultiplexer for inserting or extracting light of a particular wavelength into or from the loop fiber, or finally, an active module such as a repeater to boost the signal within the loop fiber. Most known structural implementations of these functional requirements are characterized by a metal or plastics package including a container part through the wall of which extend one or more optical fibers in sealed feedthrough arrangements. Typically the package has a cover which is screwed, glued or soldered to the container part into which optical and electro-optical elements are fixed.

These known device packages cannot easily be modified in order to substitute functions. A modular arrangement is now proposed which enables functional changes at an optical fiber access node to be made relatively quickly.

SUMMARY OF THE INVENTION

According to one aspect of the invention there is provided an optical fiber access node comprising a housing, an input fiber terminating at the housing for directing light transmitted thereby into the housing, an output fiber terminating at the housing for receiving light from within the housing and transmitting it away from the housing, and a fiber optic module retractably insertable into the housing to a lock position, the module having an element with an input port and an output port wherein, in said lock position, the input port is located to receive light from the input fiber and the output port is located to direct light into the output fiber.

The element can be a bypass fiber or a fiber having an integral tap or extension loop. The element can alternatively be a wavelength division multiplexing or demultiplexing device. In another alternative, the element can be an active device with an electrical control means extending thereto. Such an active device can incorporate one or both of a light emitting device and a photodetector together with a control circuit therefore.

A module can have an outer surface thereof adapted to closely abut an inner surface of the housing in the lock position of the module. Abutting surfaces can have a cooperating projection and recess therein to ensure accurate positioning of the module within the housing.

Preferably the axes of the input and output fiber are aligned at their terminations with the housing.

Each of the fibers can adhere to a graded index lens mounted within a wall of the housing. The module can have a recess or projection in a front surface thereof to enable the module to be manually gripped. The fiber optic element can be cast in a plastics matrix.

Alternatively the element can be set into a V groove or grooves in a base plate of the module and a top plate thereof can overlie the element, the module further comprising means for biasing the top plate towards the bottom plate to clamp the element.

The fiber optic element can have multiple parts.

The fiber ends exposed at walls of the housing can be polished flat. The input and output fibers can be pigtail fiber lengths of high radius core up to 100 microns diameter.

The housing can have a flange extending around a front edge thereof to enable the housing, following insertion into an aperture within a wall, to be fixed to the wall. The module too can have a flange positioned to abut and seal against the housing flange so as to cover space between the module and housing and thereby prevent entry of dirt and contaminants.

An embodiment of the invention will now be described by way of example with reference to the accompanying drawings, in which:

BRIEF DESCRIPTION OF THE DRAWINGS

FIG. 1 is an exploded view of an optical fiber access node particularly adapted for a wall mounting;

FIG. 2 is a plan view of a tapping module for use in the FIG. 1 access node;

FIG. 3 is a plan view of an extension module for use in the FIG. 1 access node;

FIG. 5 is a perspective view of an active module for use in the access node of FIG. 1;

DETAILED DESCRIPTION OF THE DRAWINGS

Figure 4:
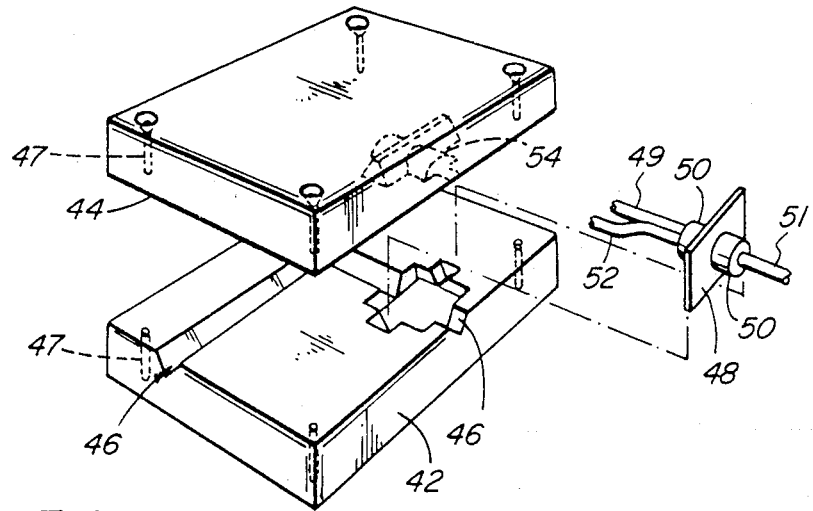
FIG. 4 is an exploded perspective view of a multiplexer module for the access node of FIG. 1.

Referring in detail to the drawings, FIG. 1 shows a fiber optic access node having an input fiber 10, an output fiber 12, a receptacle or housing 14 at which the fibers terminate, and an insertable module 15.

Fibers 10 and 12 are 50 micron core diameter fibers which extend through the wall of the molded plastics housing 14. The housing 14 is defined by a box 16 having a depth "d" of 10 centimeters, width "w" of 6 centimeters and height "h" of 2 centimeters. The box 16 has a surrounding faceplate or flange 45 having screw apertures 17 by means of which the box can be screwed to a wall. The fibers are mounted within annular flanges 18 integral with the box 16 so that central axes of the fibers are aligned. The fibers are fixed in position by a mass 19 of epoxy resin. The input and output fibers 12 and 14 have end surfaces which extend flush with the inner side surfaces of the box 16. During manufacture of the access node, the fibers 12 and 14, which can be pigtail fibers, are fixed at the correct anchoring positions shown by inserting a dummy module (not shown) into the box 16, pushing the fibers 12 and 14 against the dummy module, and then applying the mass 19 of adhesive.

Shown in spaced relationship to the housing 14 is a fiber optic module 15 containing an element 78. The module 15 can be inserted into the housing in the direction of arrow 20, the leading part of the parallelopiped module dimensioned to fit snugly into the housing 14. The fiber optic element has input and output zones, respectively 22 and 24, which in use, align with the exposed surfaces of the input and output fiber 10 and 13. To ensure accurate alignment, the side surfaces of the module and the inner side surfaces of the box 16 are formed with cooperating pips 26 and pits 28.

The module has a flange 27 at its front edge. On a back surface of the flange 27 is a gasket 29. When the module is inserted into the housing 14, the gasket seals over the space between the inner wall of the box 16 and the outer surface 31 of the module. The module has a recessed handle 25 enabling it to be readily gripped to pull it from the housing 14. As an alternative to a recessed handle, the module can have a protruding handle or can alternatively be made of a slightly greater depth than the receptacle so that a part of the module juts above the entrance to the receptacle.

In the embodiment shown in FIG. 1, the element 18 is simply a bypass fiber which has polished end surfaces 22 and 24 extending flush with the outer side surfaces of a molded plastic support 31. The module is made by mounting a fiber within a vertical elongate chamber, injection molding plastics around the mounted fiber, allowing the plastics to solidify and then cutting the molding into lengths corresponding to width "w" of the box 16. The cut surfaces corresponding to the side surfaces of the module shown in FIG. 1 are then polished.

The access node is inserted easily into a loop fiber (not shown) by cleaving the loop fiber and fusion splicing the distal ends of the input and output pigtail fibers 10 and 12 to the cleaved ends of the loop fiber.

As indicated previously the advantage of the modular access node is that modules 15 can be substituted when the service given at a particular access node is to be changed. The module shown in FIG. 1 is the simplest module, a bypass. A more complex module is shown in plan view in FIG. 2, the module having a fiber length 30 extending between the module side surfaces as in the FIG. 1 module but with a tapping fiber 32 extending out of the module 15 from a front surface 38. In use when the module 15 is inserted into the housing 14, light can be tapped from the loop fiber to a piece of station equipment 34. Alternatively light can be generated or modulated at the station 34 and transmitted back into the loop fiber. The module can be made in a manner similar to the module of FIG. 1. Thus a number of tapping zones can be formed on a single host fiber by twisting the tapping fibers around the host fiber and heating the several twist zones to promote fusion. Such an optical fiber tap is known as a fused coupler. Ideally several such taps are formed along a single host fiber which is then encapsulated in plastics and cut into separate one tap lengths corresponding to the desired width of the modules.

Referring to FIG. 3 the module here is made using a single fiber 36 but instead of it passing directly between the side surfaces of the module, the module is made with a loop of the fiber extending out of the front wall 38 of the plastics molding 28. The loop is then cleaved to enable a piece of station equipment 40 or perhaps a test set to be inserted into the extension loop.

Referring to FIG. 4, there is shown a wavelength division demultiplexer module. The module has two molded plates 42 and 44. A lower rigid plastics plate 42 has a series of V grooves 46 dimensioned and sited to receive the various parts of a wavelength division demultiplexer, a wavelength dependent filter 48, an input fiber 49, a pair of graded index lenses 50, and output fiber taps 51 and 52. The upper plate 44 is made of resilient plastics and has recesses 54 for location of the demultiplexer elements. The two plates 42 and 44 are fixed together by screw and nut assemblies (not shown) extending through holes 47. In operation of the multiplexer, light incident on the filter 48 from input fiber 49 has components at different wavelengths $\lambda_1$ and $\lambda_2$. The incident light directed at the filter at an angle at which light aCt wavelength $\lambda_1$ passes through the filter 48 and into output fiber 51 while light at wavelength $\lambda_2$ is reflected from the filter 48 and is directed by the graded index lens into the output fiber 52.

Other assemblies of demultiplexer elements are known and can be packaged in a module similar to that shown in FIG. 4. This demultiplexer module is used, for example, when several optical channels are to be demultiplexed from a single loop fiber signal, each channel being transmitted at a distinct wavelength. Although only the demultiplexer is shown in FIG. 4, it will be understood that a multiplexer has an identical configuration but in the latter case, fibers 51 and 52 are input fibers and fiber 49 is an output fiber.

Referring to FIG. 5 there is shown in perspective view another module of the two-plate type shown in FIG. 4. Clamped between the plates in an array of locating grooves or recesses are a light emitting diode 56, a PIN photodiode 58 and between these two devices and electrically connected to them by leads is an integrated circuit 60. The integrated circuit interfaces with a plug 64 insertable into an aperture defined by the two plates 42 and 44, the plug having leads 62 for connection to equipment necessary to power the light emitting diode and the PIN photodiode.

The various components of the FIG. 5 module can be individually mounted between the plates or can be encapsulated in a plastics matrix with leads 62 extending from one face, a laser output facet exposed at another face and a photodetector input surface exposed at a third face.

Figure 6:
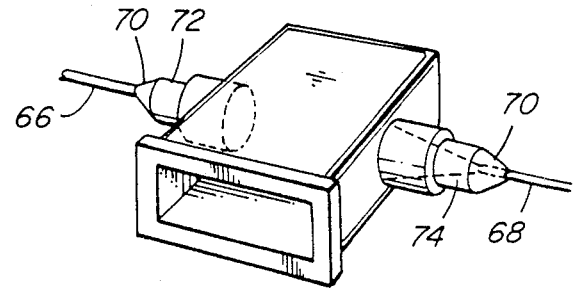
FIG. 6 is a perspective view of an alternative type of housing for an access node according to the invention.

As an alternative to wide core input and output fibers used in the previous embodiments, FIG. 6 shows a module having input and output fibers 66 and 68 respectively, of 50 micron core and 120 micron outer diameter. The fibers have ends fixed by masses 70 of an epoxy resin to graded index lenses 72 and 74. These lenses are mounted to the housing or receptacle in the same way as the wide core fiber illustrated in FIG. 1. The lens 72 operates to expand the beam originating from the input fiber 66 for passage through a relatively large diameter bypass within the module (not shown), the expanded light then being focussed by the lens 74 onto the core of the output fiber 68.

Figure 7:
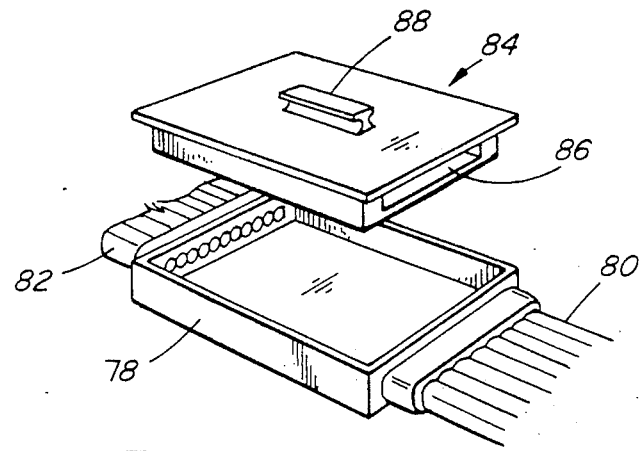
FIG. 7 is a perspective view of another form of access node according to the invention.

The embodiments of FIGS. 1 to 5 have a single input and a single output fiber terminating at the housing 14. In many optical fiber loop installations, a ribbon fiber is used. As shown in the FIG. 7 access node, the receptacle or housing 78 is of relatively shallow depth and ribbon fibers 80 and 82 terminate along opposed sides. The module 84, a rectangular hollow, internally reflecting star coupler, is inserted downwardly into the receptacle or tray, an input aperture 86 of the star coupler being aligned with the input fiber ribbon 80 and its outlet apertures being aligned with the output fiber ribbon 82. Cooperating pips and pits (not shown) on abutting surfaces lock the module in position. The module is withdrawn by tugging on a handle 88.

In all of the embodiments shown above, the input and output fibers are axially aligned at their terminations with the receptacle. It will be understood that the fibers can approach the module at angles to one another. A corresponding reorientation of the element or elements within the module may be necessary but this is readily achievable using a flexible fiber.

In addition, the fibers terminate at opposed faces of a rectangular receptacle. In fact, another fiber can terminate at a reverse face of the receptacle, the corresponding module also having an additional port. Indeed, so long as the module can be readily extracted from the receptacle and is securely retained in the receptacle during normal operation, the module and receptacle housing can be of other shapes with a plurality of input and/or output fibers.

What is claimed is:

1. An optical fiber access node comprising a box housing open at a front face and having first and second side walls, said side walls having respective first and second apertures therein, an input fiber terminating at the first side wall for directing light transmitted by the input fiber through the first aperture into the box housing, an output fiber terminating at the second side wall for receiving light through the second aperture from within the box housing, a fiber optic module retractably insertable into the housing through said front face, and means for locking the fiber optic module in the housing at a locked position, the module having an optical element with an optical input port and an optical output port wherein, in said locked position, the input port is located to receive light from the input fiber and the output port is located to direct light from the element into the output fiber.

2. An optical fiber access node as claimed in claim 1, the module having respective side walls, the side wall spacing such that in the locked position, the side walls of the module are closely adjacent respective side walls of the box housing, the side walls of the housing and the side walls of the module having interengagable projections and recesses, the projections engagable within respective recess to fix the position of the module relative to the housing.

3. A fiber optic access node as claimed in claim 1 in which the input fibers are axially aligned at the housing.

4. A fiber optic access node as claimed in claim 1 in which the input and output fibers terminate respectively at a first collimating lens and a first focussing lens and, in said locked position said collimating and focussing lenses are aligned respectively with the input and output ports of the optical element.

5. A fiber optic access node as claimed in claim 1 in which the module in said locked position has an exposed front surface configuration permitting the module to be manually gripped.

6. A fiber optic access node as claimed in claim 1 in which the element is cast in a block plastics matrix.

7. A fiber optic access node as claimed in claim 1 in which the element is clamped between a pair of plates which plates are biased together.

8. A fiber optic access node as claimed in claim 7 in which at least one of the plates is formed with at least one V groove to receive the element.

9. A fiber optic access node as claimed in claim 7 in which at least one of the plates is made of a resilient plastics.

10. A fiber optic access node as claimed in claim 1 in which the element has multiple parts.

11. A fiber optic access node as claimed in claim 1 in which ends of the input and output fibers are exposed at walls of the housing, the ends being polished flat.

12. A fiber optic access node as claimed in claim 1 in which the input and output fibers are pigtail fibers.

13. A fiber optic access node as claimed in claim 1 in which, in said locked position, the module projects from the housing.

14. A fiber optic access node as claimed in claim 1 in which the housing is a box having an integral flange extending around a periphery of the box, the flange having means associated therewith for fixing the housing to a support structure.

15. A fiber optic access node as claimed in claim 14 in which the module has a flange extending around a periphery thereof, the flange adapted to seal against the housing flange in the lock position.

16. A fiber optic access node as claimed in claim 1 in which the module is a bypass module including a single span of fiber extending between the input and output ports.

17. A fiber optic access node as claimed in claim 1 in which the module is a fiber tap module having a first span of fiber extending between the input and output ports and a second tap fiber fused to the first span, the second tap fiber extending away from the housing when the module is in the lock position.

18. A fiber optic access node as claimed in claim 1 in which the module is a fiber extension module having a fiber span with one end aligned with the input port and its opposite end aligned with the output port, the fiber extending from the ports through a plastics support matrix and out of a front surface of the module, the fiber being cleaved at an intermediate position based from the module to enable insertion at the cleave zone of a fiber optic equipment.

19. A fiber optic access node as claimed in claim 1 in which the element is a wavelength division multiplexing device.

20. A fiber optic access node as claimed in claim 1 in which the element is a coupler.

21. A fiber optic access node as claimed in claim 1 in which the element is an active element.

22. A fiber optic access node as claimed in claim 21 in which the active element has a light emitting device, positioned to emit light at said output port and a photodetector positioned to receive light at said input port and an integrated circuit pack controlling the light emitting device and the photodetector, the integrated circuit pack having electrical leads extending out of the module.

23. A fiber optic access node as claimed in claim 1, the housing having a plurality of input fibers terminating thereat.

24. A fiber optic access node as claimed in claim 1 in which the module is substantially rectangular.

25. A fiber optic access node as claimed in claim 1 in which the element is a wavelength division demultiplexing device.

26. A fiber optic access node as claimed in claim 1, the housing having a plurality of output fibers terminating thereat.

27. A fiber optic access node as claimed in claim 4 in which said input and output fibers terminate at respective graded index lenses mounted within respective side walls of the housing.

* * * * *